US012716580B1

(12) United States Patent
Watanabe et al.

(10) Patent No.: US 12,716,580 B1
(45) Date of Patent: Aug. 25, 2026

(54) ILLUMINATED DIVIDER ASSEMBLY FOR AN APPLIANCE

(71) Applicant: Haier US Appliance Solutions, Inc., Wilmington, DE (US)

(72) Inventors: Michael C. Watanabe, Louisville, KY (US); John Alexander Gardner, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 19/228,884

(22) Filed: Jun. 5, 2025

(51) Int. Cl.

| | |
|---|---|
| ***F21V 33/00*** | (2006.01) |
| ***F21V 23/06*** | (2006.01) |
| ***F25D 23/06*** | (2006.01) |
| ***F25D 27/00*** | (2006.01) |
| *F21W 131/305* | (2006.01) |
| *F21Y 115/10* | (2016.01) |

(52) U.S. Cl.
CPC .......... *F21V 33/0044* (2013.01); *F21V 23/06* (2013.01); *F25D 23/069* (2013.01); *F25D 27/00* (2013.01); *F21V 2200/20* (2015.01); *F21W 2131/305* (2013.01); *F21Y 2115/10* (2016.08)

(58) Field of Classification Search
CPC ...... F25D 27/00; F25D 27/005; F25D 23/069; F21W 2131/305; F21V 33/0044; F21V 2200/20; F21V 23/06
See application file for complete search history.

(56) References Cited

U.S. PATENT DOCUMENTS

| | | | |
|---|---|---|---|
| 3,506,325 A | 4/1970 | Horvay | |
| 5,425,124 A * | 6/1995 | McRight | G02B 6/0008 385/115 |
| 6,042,244 A | 3/2000 | Witkoski | |
| 6,231,205 B1 | 5/2001 | Slesinger et al. | |
| 7,338,180 B2 | 3/2008 | Wing | |
| 8,322,873 B2 | 12/2012 | Glovatsky et al. | |
| 8,387,405 B2 | 3/2013 | Johnson | |
| 8,764,135 B1 | 7/2014 | Huang | |
| 8,911,042 B2 | 12/2014 | Bassi et al. | |
| 9,766,010 B2 | 9/2017 | Katu | |
| 9,845,986 B2 | 12/2017 | Sankhgond | |
| 9,897,372 B2 | 2/2018 | Daniel et al. | |
| 10,345,462 B2 | 7/2019 | Rokkan et al. | |
| 10,408,532 B1 | 9/2019 | Wantland et al. | |
| 10,451,339 B1 | 10/2019 | Wantland et al. | |
| 11,091,958 B2 | 8/2021 | Wanta et al. | |
| 2004/0264160 A1 | 12/2004 | Bienick | |

(Continued)

FOREIGN PATENT DOCUMENTS

| | | |
|---|---|---|
| KR | 20200102821 A | 9/2020 |
| WO | WO2018001502 A1 | 1/2018 |

*Primary Examiner* — Robert J May
(74) *Attorney, Agent, or Firm* — Dority & Manning, P.A.

(57) ABSTRACT

A cabinet and a container disposed within the cabinet. The container defines a slot having a first length. A divider assembly of the refrigerator appliance includes a body and a bus bar is disposed between the cabinet and the container. A pin is coupled with the body, the pin is configured to be received by the slot of the container and slidably contact the bus bar. The bus bar electrically powers the pin. The pin is able to contact a non-discrete section of the bus bar along the first length of the slot. A lighting system is coupled with the body. The lighting system is powered by the pin electrically coupled with the bus system.

20 Claims, 5 Drawing Sheets

(56) References Cited

U.S. PATENT DOCUMENTS

| | | | | |
|---|---|---|---|---|
| 2008/0007945 | A1 | 1/2008 | Kelly et al. | |
| 2008/0186696 | A1 | 8/2008 | Awai et al. | |
| 2008/0236183 | A1 | 10/2008 | Iimura | |
| 2008/0307919 | A1 | 12/2008 | Cable et al. | |
| 2010/0290251 | A1 | 11/2010 | Wang et al. | |
| 2010/0319391 | A1 | 12/2010 | Lim et al. | |
| 2013/0099651 | A1 | 4/2013 | Hwang et al. | |
| 2014/0152166 | A1 | 6/2014 | Baum et al. | |
| 2014/0265802 | A1 | 9/2014 | Wilcox et al. | |
| 2014/0312759 | A1 | 10/2014 | Song et al. | |
| 2014/0320040 | A1* | 10/2014 | Katu | H05B 45/20 362/92 |
| 2015/0022072 | A1 | 1/2015 | Haltmeyer et al. | |
| 2015/0069066 | A1 | 3/2015 | Choi et al. | |
| 2016/0153704 | A1 | 6/2016 | Burke et al. | |
| 2016/0282037 | A1 | 9/2016 | Han et al. | |
| 2018/0149415 | A1 | 5/2018 | Jo et al. | |
| 2018/0266671 | A1 | 9/2018 | Hiemstra et al. | |

* cited by examiner

ILLUMINATED DIVIDER ASSEMBLY FOR AN APPLIANCE

FIELD OF THE INVENTION

The present subject matter relates generally to appliances, and more particularly to divider assemblies within refrigerator appliances.

BACKGROUND OF THE INVENTION

Refrigerator appliances generally include a cabinet that defines a chilled chamber. A wide variety of food items may be stored within the chilled chamber. The low temperature of the chilled chamber relative to ambient atmosphere assists with increasing a shelf life of the food items stored within the chilled chamber.

Some refrigerators appliances may include drawers or bins that stored chilled or frozen food. The drawers may have a depth that is great enough that stored items may be buried, or out-of-sight, within the drawers. Furthermore, the drawers may store items in an unorganized manner that is unsightly to a user. Even further, items stacked on shelves within the refrigerator appliance may face similar disorganization issues.

Accordingly, improvements of storage management within refrigerator appliances would be useful. More specifically, improvements to the sightliness of items stored in drawers or on shelves would be particularly useful.

BRIEF DESCRIPTION OF THE INVENTION

Aspects and advantages of the invention will be set forth in part in the following description, or may be apparent from the description, or may be learned through practice of the invention.

In one example embodiment, a refrigerator appliance includes a cabinet and a container disposed within the cabinet. The container defines a slot having a first length. A divider assembly of the refrigerator appliance includes a body and a bus bar is disposed between the cabinet and the container. A pin is coupled with the body, the pin is configured to be received by the slot of the container and slidably contact the bus bar. The bus bar electrically powers the pin. The pin is able to contact a non-discrete section of the bus bar along the first length of the slot. A lighting system is coupled with the body. The lighting system is powered by the pin electrically coupled with the bus system.

In another exemplary embodiment, a divider assembly is for a refrigerator. The refrigerator includes a cabinet and a container disposed within the cabinet. The container defines a slot that has a first length. The divider assembly includes a body and a bus bar is disposed between the cabinet and the container. A pin is coupled with the body, the pin is configured to be received by the slot of the container and slidably contact the bus bar. The bus bar electrically powers the pin. The pin is able to contact a non-discrete section of the bus bar along the first length of the slot. A lighting system is coupled with the body. The lighting system is powered by the pin electrically coupled with the bus system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
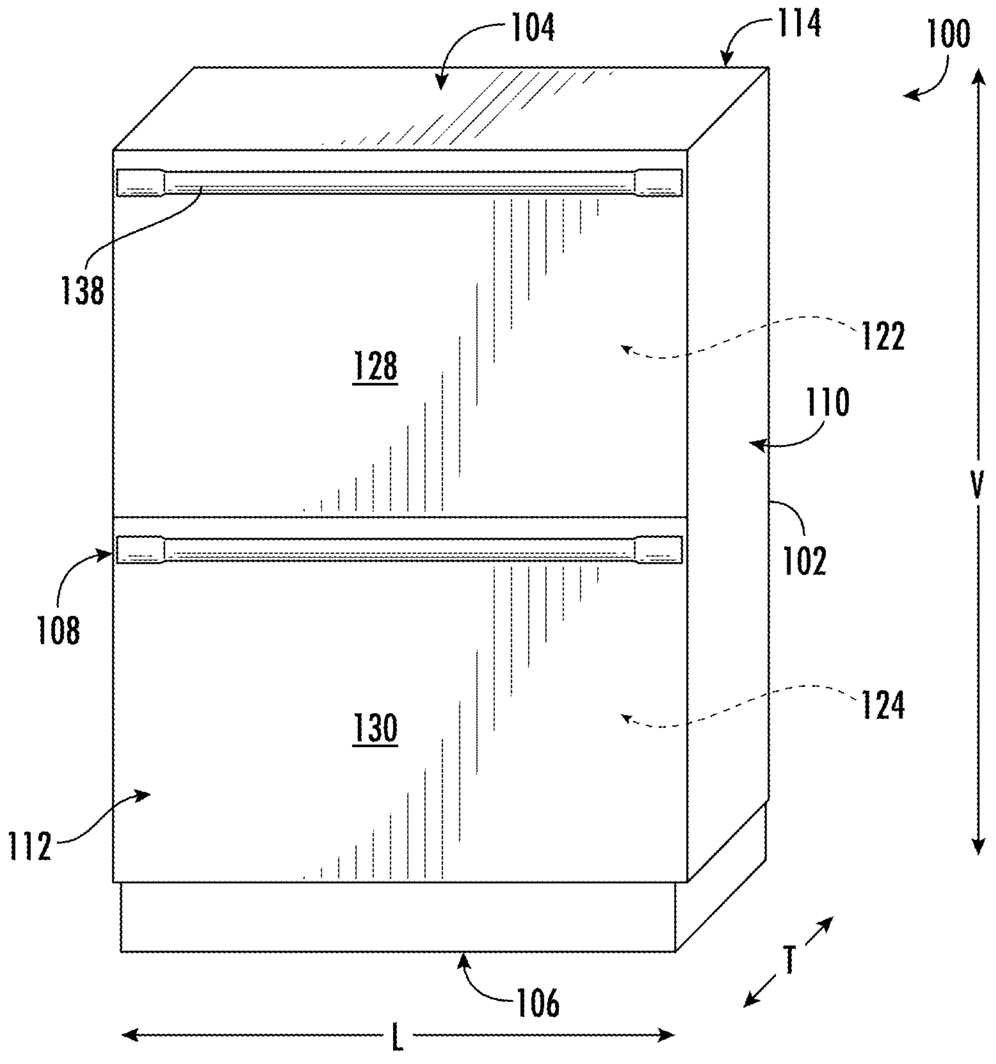
FIG. 1 provides a front elevation view of an example refrigerator appliance, according to examples of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," or "bottom" are used with reference to the perspective of a user accessing the refrigerator appliance. For example, a user stands in front of the refrigerator to open the doors and reaches into the food storage chamber(s) to access items therein.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
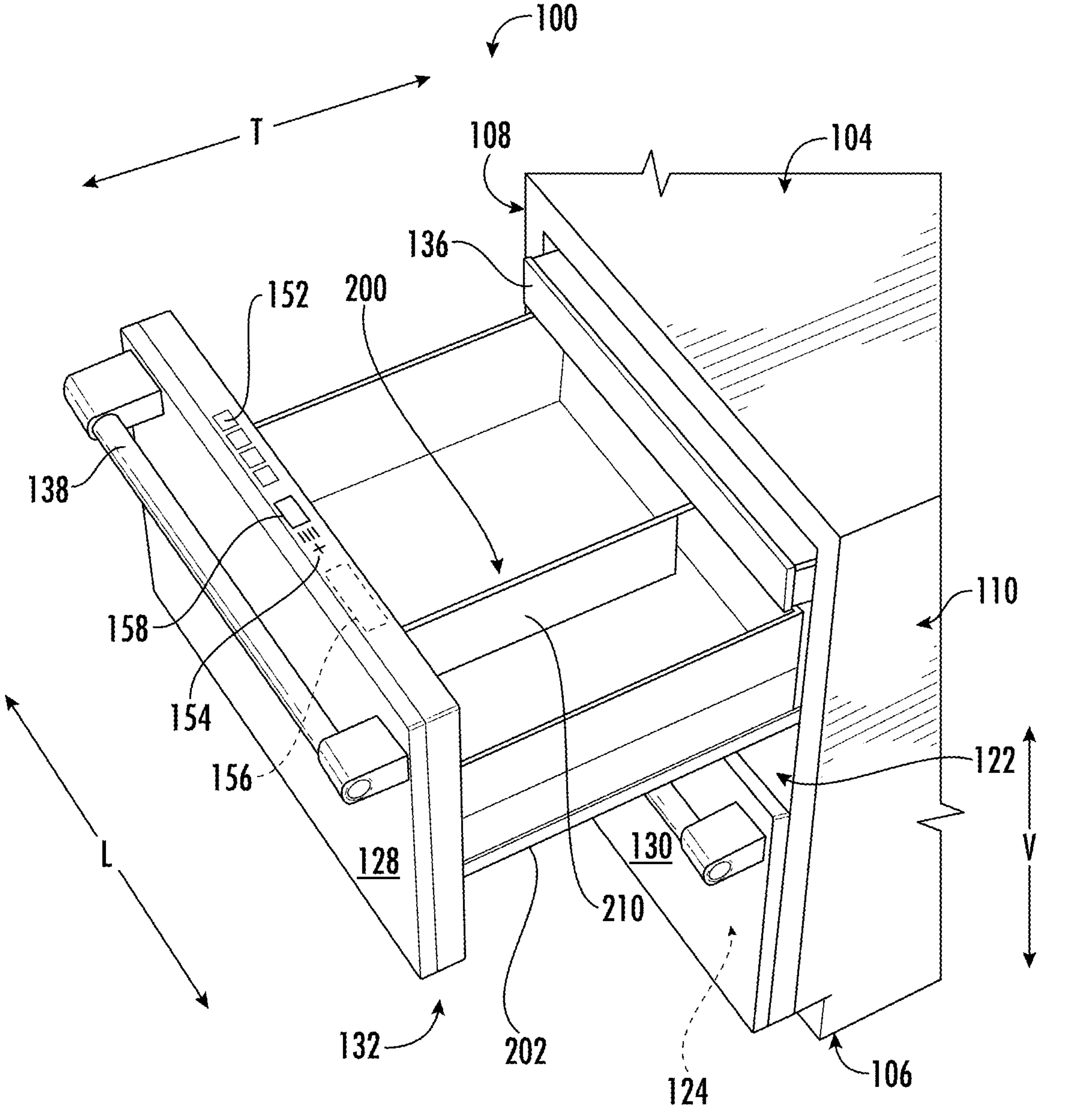
FIG. 2 provides a top perspective view of the refrigerator appliance of FIG. 1 according to examples of the present subject matter.
Figure 3:
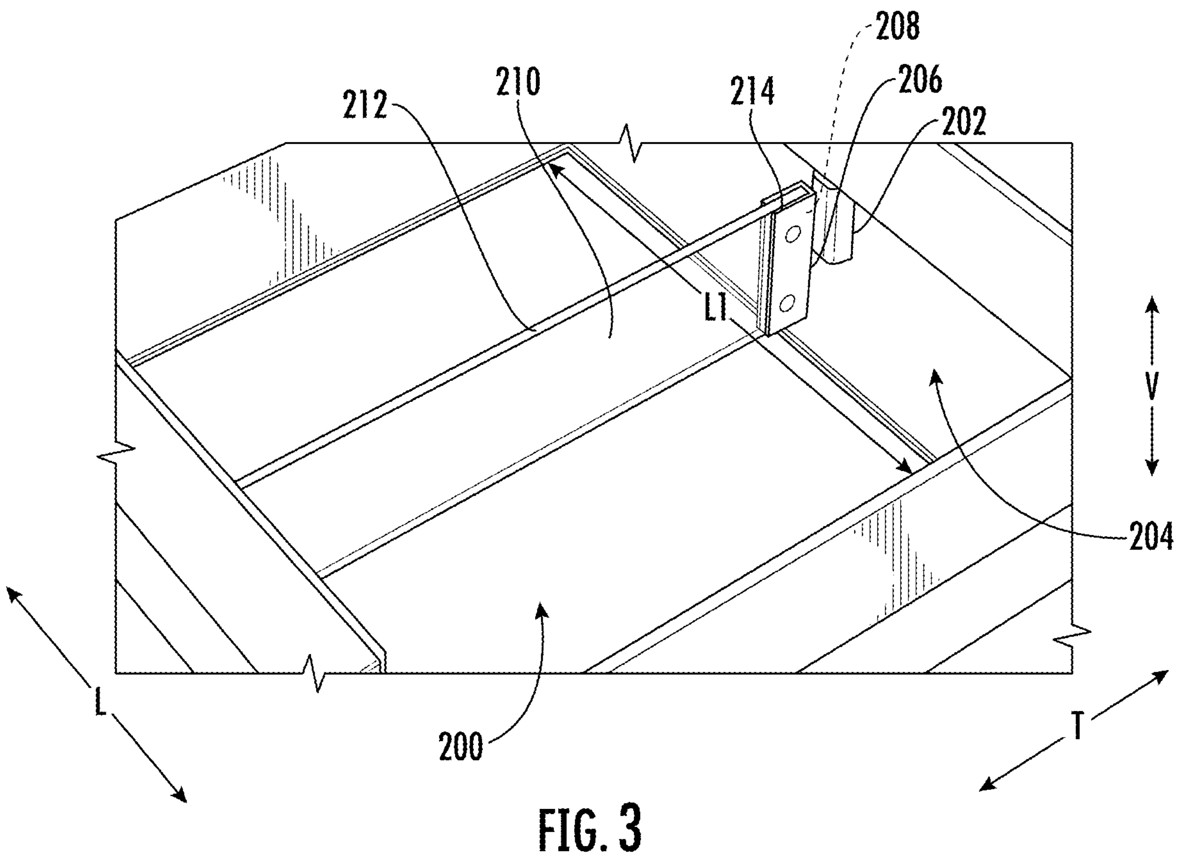
FIG. 3 provides another top perspective view of the refrigerator appliance of FIG. 1 according to examples of the present subject matter.

FIG. 1 is a front perspective view of an example embodiment of a refrigerator appliance 100. FIG. 2 is a top perspective view of the refrigerator appliance 100 with a door 128 that is open. FIG. 3 is another top perspective view of the refrigerator appliance 100 with a divider assembly 200. Refrigerator appliance 100 extends between a top 104, or top side, and a bottom 106, or bottom side, along a vertical direction V. Refrigerator appliance 100 also extends between a first side 108 and a second side 110 along a lateral direction L which is perpendicular to the vertical direction V. Refrigerator appliance 100 also extends between a front side 112 and a rear side 114 along a transverse direction T which is perpendicular to the lateral direction L which is perpendicular to the vertical direction V.

Refrigerator appliance 100 includes a cabinet 102. Furthermore, the refrigerator appliance 100 may include a refrigerator chamber 22, or fresh food chamber, and a freezer chamber 124. Additionally, or alternatively, each chamber 122, 124 may be a convertible chamber that operates as either a fresh food chamber or a freezer chamber. Additionally, or alternatively, the refrigerator appliance 100 may be referred to as an under-counter refrigerator or a refrigerator that is divided horizontally into a top portion and a bottom portion. To prevent leakage of cool air, refrigerator doors 128, freezer door 130, and/or cabinet 102 may define one or more sealing mechanisms (e.g., rubber gaskets, not shown) at the interface where the doors 128, 130 meet cabinet 102. Using the teachings disclosed herein, one of skill in the art will understand that the present technology can be used with other types of refrigerators or a freezer appliance as well. Consequently, the description set forth herein is for illustrative purposes only and is not intended to limit the technology in any aspect.

Refrigerator doors 128, 130 are each slidably coupled to the cabinet 102 for accessing refrigerated items such as food items, for example. It should be noted that while two doors 128, 130 in an "under-counter" configuration are illustrated, any suitable arrangement of doors utilizing one, two or more doors is within the scope and spirit of the present disclosure.

Using the teachings disclosed herein, one of skill in the art will understand that the present subject matter can be used with other household appliances, including other types of refrigerators such as a standalone refrigerator or freezer only unit (e.g., a column unit), a refrigerator/freezer combination, side-by-side, bottom mount, compact, and any other style or model of refrigerator appliance. Accordingly, other configurations of refrigerator appliance 100 could be provided, it being understood that the configurations shown in the accompanying figures and the description set forth herein are by way of example for illustrative purposes only.

The refrigerator appliance 100 may include a controller 156. Operation of the refrigerator appliance 100 can be regulated by a controller 156 that is operatively coupled to the lighting assembly 108. The refrigerator appliance 100 may include a control panel 152 that provides selections for user manipulation of the operation of refrigerator appliance 100 to modify environmental conditions therein, such as the light produced by a lighting assembly 208, etc. Operation of the refrigerator appliance 100 can be regulated by the controller 156, e.g., controller 156 may regulate operation of various components of the refrigerator appliance 100 in response to programming and/or user manipulation of the user interface panel.

The controller 156 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 162 as disclosed herein are capable of and may be operable to perform any methods and associated method steps as may be disclosed herein.

The controller 156 may be positioned in a variety of locations throughout refrigerator appliance 100. In the illustrated embodiment, the controller 156 may be located on or within the door 128. In such an embodiment, input/output ("I/O") signals may be routed between the controller 156 and various operational components of refrigerator appliance 100. In one embodiment, the control panel 152 may represent a general purpose I/O ("GPIO") device or functional block. In one embodiment, the control panel 152 may include input components 154, such as one or more of a variety of electrical, mechanical or electro-mechanical input devices including rotary dials, knobs, buttons, touchscreen interfaces, etc. In this regard, inputs 154 may be in communication with a processing device or controller 156. Signals generated in controller 156 operate refrigerator appliance 100 in response to selector inputs 154. The control panel 152 may include a display component 158, such as a digital or analog display device designed to provide operational feedback to a user. The control panel 152 and the lighting assembly 208 may be in communication with the controller 156 via one or more signal lines or shared communication busses, e.g. a bus bar 216.

As used herein, "processing device" or "controller" may refer to one or more microprocessors or semiconductor devices and is not restricted necessarily to a single element. The processing device can be programmed to operate refrigerator appliance 100 and other components of refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

With reference to FIGS. 2 through 5, the refrigerator appliance 100 includes the fresh food chamber 122 and the freezer chamber 124. Each chamber 122, 124 may be accessed via a respective door (e.g., a fresh food door 128 and a freezer door 130). Further, the refrigerator appliance 100 may include a handle 138 coupled with the door 128 and/or 130 for allowing a user to open and close the door 128 or 130. The refrigerator appliance 100 may further include a container 202 selectively (e.g., slidably) received by the fresh food chamber 122, as illustrated in the examples of the figures. Various storage components may be mounted within the fresh food chamber 122 or the freezer chamber 124 to facilitate storage of food items therein as will be understood by those skilled in the art. In particular, the storage components may include bins (not shown) and shelves 136. Each of these storage components are configured for receipt of food items (e.g., beverages and/or solid food items) and may assist with organizing such food items. Such storage components may be mounted on refrigerator doors 128 or may slide into a receiving space in the fresh food chamber 122 or the freezer chamber 124. It should be appreciated that the illustrated storage components are used only for the purpose of explanation and that other storage components may be used and may have different sizes, shapes, and configurations.

Additionally, or alternatively, the container 202 may be selectively received by the freezer chamber 124. The container 202 may include a drawer 132 (as illustrated in the examples of the figures), the shelf 136, a liner (not shown), a cubby (not shown), tote (not shown), the like, or a combination thereof. For example, the container 202 may couple the door 128 to the cabinet 102 via a roller assembly (not shown). The container 202 may hold, or be divided by, a divider assembly 200.

With specific reference to FIG. 2, the divider assembly 200 may be coupled with and held by the container 202. As illustrated in the example of the figure, the divider assembly 200 extends along the transverse direction T and the vertical direction V to divide the container 202 into a first portion 240 and a second portion 242. More specifically, a body 210 of the divider assembly 200 extends along the transverse direction T and the vertical direction V to bisect the container 202 into two lateral halves (e.g., the first portion 240 and the second portion 242). The body 210 may have a first thickness T1. The first thickness T1 may be greater than a thickness of the container 202 (e.g., a wall of the container 202). Although the body 210 is illustrated as bisecting the container 202, the divider assembly 200 may be coupled with the container 202 at any suitable locations therein to divide the container 202 into two equal or unequal spaces. For example, the body 210 of the divider assembly 200 may extend along a transverse vertical plane as shown, but the body 210 may also conceivably extend along a lateral transverse plane, a lateral vertical plane, or a combination thereof. The body 210 is described in more detail below.

With reference to FIG. 3, the container 202 defines a slot 204, or first slot, that extends a first length L1. The slot 204 may extend laterally along a lateral wall (not labeled) of the container 202, as illustrated in the examples of the figures. Additionally, or alternatively, the slot 204 may be specifically defined by a transverse wall (not labeled) of the container 202, a floor panel (not labeled) of the container 202, or another wall of the container 202. For example, the slot 204 may extend along the transverse direction T.

With continued reference to FIG. 3, the divider assembly 200 includes a pin 206 coupled with the body 210. The pin 206 is configured to extend into the slot 204. For example, the pin 206 may extend away from the body 210 and into the slot 204 along the transverse direction T, as illustrated in the example embodiment of the figure. The pin 206 received by the slot 204 may allow the body 210 to remain static relative to the container 202. More specifically, the pin 206 may allow the body 210 to remain static relative to the container 202 in the vertical direction V. The slot 204 and the pin 206 are described in more detail below.

Figure 4:
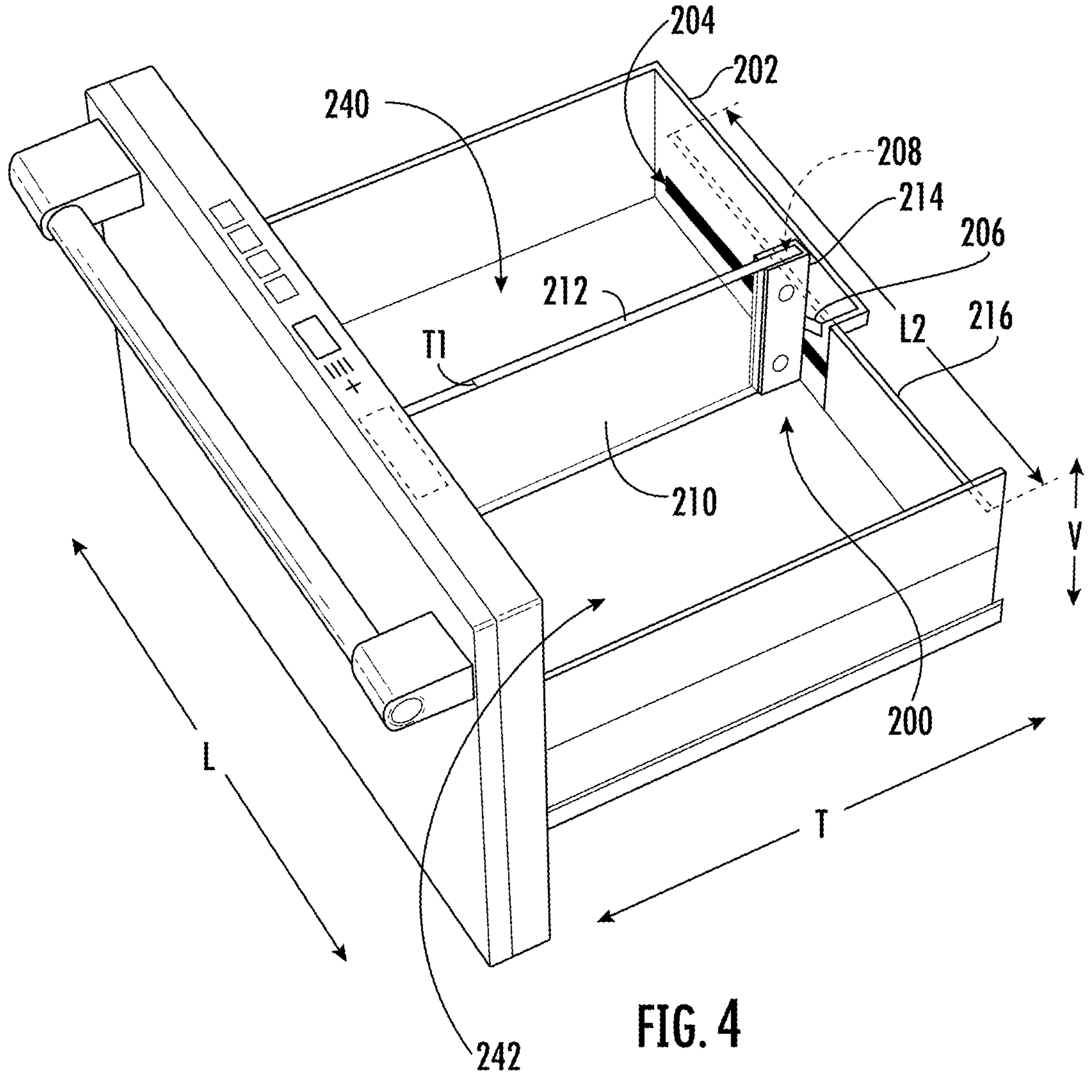
FIG. 4 provides top cut-away perspective view of the refrigerator appliance of FIG. 3 according to examples of the present subject matter.
Figure 5:
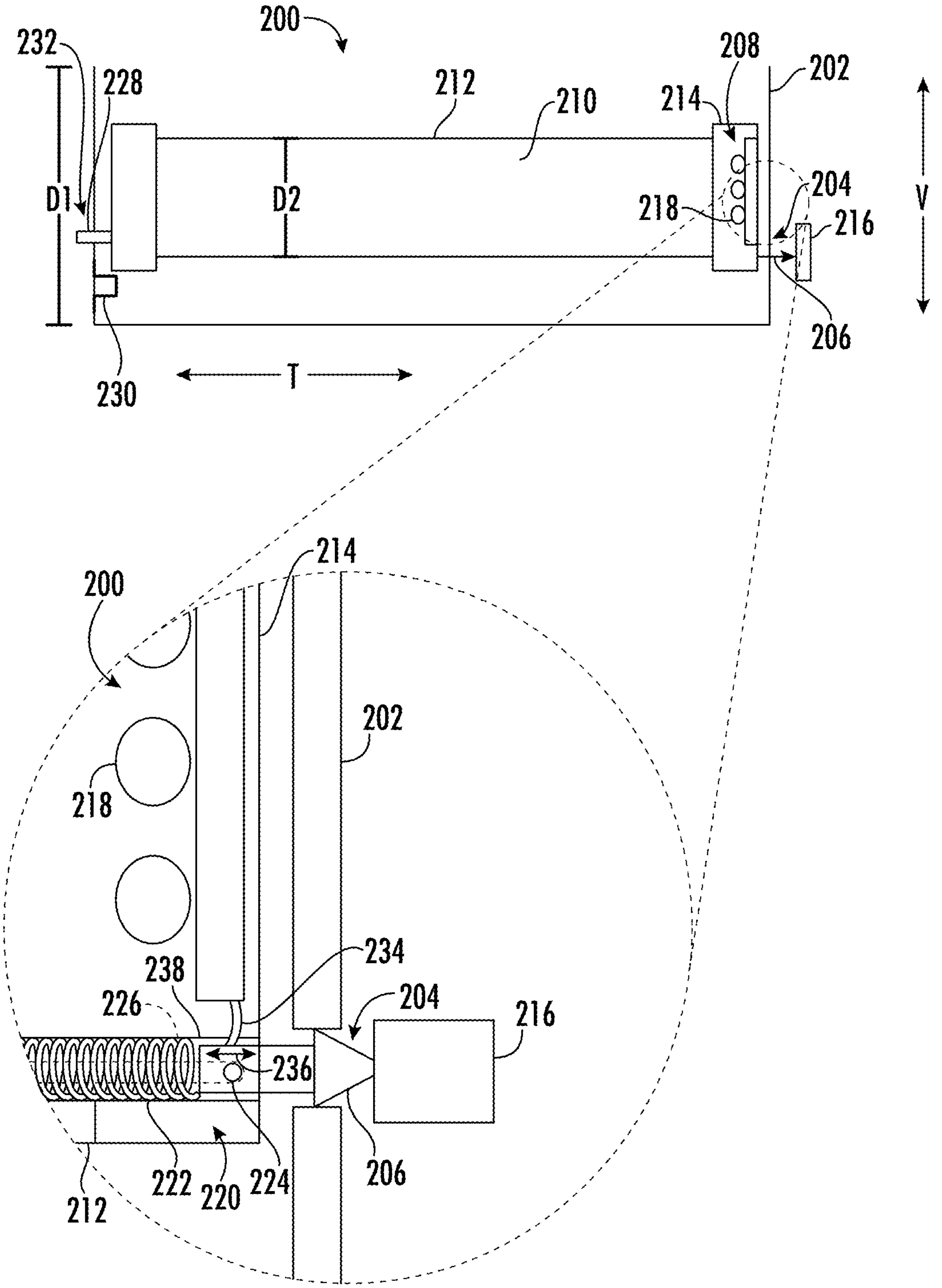
FIG. 5 provides a cross-sectional view of the refrigerator appliance of FIG. 1 according to examples of the present subject matter.

With reference to FIGS. 3 through 5, the divider assembly 200 may further include the lighting assembly 208 coupled with the body 210. The lighting assembly 208 may be coupled with the pin 206. For example, a wire 234 may electrically couple the lighting assembly 208 with the pin 206. The lighting assembly 208 may include any suitable number, type, position, and configuration of electrical light source(s) 218, using any suitable light technology and illuminating in any suitable color. For example, according to the illustrated embodiment, light sources 218 may include one or more light emitting diodes (LEDs), which may each illuminate in a single color (e.g., white LEDs), or which may each illuminate in multiple colors (e.g., multi-color or RGB LEDs) depending on the control signal from controller 156. However, it should be appreciated that according to alternative embodiments, lighting assembly 208 may include any other suitable traditional light bulbs or sources, such as laser lights, halogen bulbs, fluorescent bulbs, incandescent bulbs, glow bars, a fiber light source, etc. In addition, it should be appreciated that lighting assembly 208 may include one or more mirrors, reflectors, light transmitters, light pipes, etc., for achieving the desired illumination.

More specifically, the light source 218 may be electrically coupled with the pin 206. The light source 218 directs light energy into and through the body 210. For example, the body 210 may be transparent, or made of a material that allows light to pass through. Further, the body 210 may include a peripheral edge 212. The peripheral edge 212 may include a matte texture that is rougher than other portions of the body 210. Thus, the peripheral edge 212 may be illuminated by the LED 218 of the lighting assembly 208 to provide the body 210 with an aesthetically pleasing look where the peripheral edge 212 appears to a user to glow, or emit light. Thus, a user can view the container 202 and still distinguish the divider assembly 200 from stored items adjacent thereto. Additionally, or alternatively, the lighting assembly 208, which is communicatively coupled with the controller 156, may activate the LED 218 based on the door(s) 128 and/or 130 being open to save energy if the door(s) 128 and/or 130 is/are closed.

With continued reference to FIGS. 3 through 5, the divider assembly 200 may further include a cover 214 coupled with the body 210. The cover 214 may cover the lighting assembly 208 to hide the lighting assembly 208 from view of the user. For example, the user may view the divider assembly 200 and see the cover 214 with light energy being emitted from therein into the body 210 and being reflected at the peripheral edge 212 having the matte texture. In other words, the lighting assembly 208 may be positioned between the cover 214 and the body 210. For example, the cover 214 may be coupled with the body 210 where the divider assembly 200 couples with the container 202, as shown in the examples of the figures.

Referring again to the body 210 and the container 202, as shown in FIG. 5, the container 202 may have a first depth D1 and the body 210 may have a second depth D2. The first depth D1 and the second depth D2 may be substantially equal. Additionally, or alternatively, the second depth D2 may be less than the first depth D1.

With continued reference to FIGS. 3 through 5, the divider assembly 200 may include a retraction assembly 220 generally coupled with the body 210. More specifically, the retraction assembly 220 may include a biasing member 222 coupled with the body 210. The biasing member 222 may include a spring, as illustrated in the example of FIG. 5. Additionally, or alternatively, the biasing member 222 may include a mechanism having a spring-constant (e.g., a coil, a clip, etc.). The biasing member 222 may be coupled with the pin 206, as shown in the example of FIG. 5. The biasing member 222 may bias the pin 206 away from the body 210 and towards, or through, the slot 204 of the container 202. Further, the retraction assembly 220 may include an actuator 224 coupled with the pin 206.

The actuator 224 may include a protrusion configured to be handled by the user. A user may interact with the actuator 224 at the protrusion to move the pin 206 between an extended position (FIGS. 3 through 5) and a retracted position (not shown). The pin 206 in the extended position may contact the container 202. Additionally, or alternatively, the slot 204 may be sized to allow the pin 206 to pass therethrough without the pin 206 contacting the container 202. The arrow 236 may indicate the path of travel the pin 206 may take moving between the retracted position and the extended position. For example, a user may place a finger on the actuator 224 and apply a force to overcome the biasing member 222 to move the pin 206 from the extended position to the retracted position. Additionally, or alternatively, the body 210 may define a cavity 238 that is configured to retain the biasing member 222 and selectively retain the pin 206 in the retracted position. Further, the body 210 may define a track 226 configured to receive the actuator 224. For example, the actuator 224 may extend from the pin 206 within the cavity 238 and through the track 226.

Referring now to FIGS. 4 and 5, the divider assembly 200 includes a bus bar 216 positioned between the container 202 and the cabinet 102 (FIGS. 1 and 2). The bus bar 216 may be communicatively coupled with the controller 156. The pin 206 in the extended position slidably contacts the bus bar 216 to power the lighting assembly 208. The bus bar 216 has a second length L1 that may be greater than or substantially equal to the first length L1 of the slot 204. Additionally, or alternatively, there may be a plurality of divider assemblies. Accordingly, there may be a bus bar and a slot corresponding to each divider assembly. For example, each slot and bus bar may have respective lengths where the length of each bus bar is greater than or equal to the length of each slot. The bus bar 216 may continuously extend along the second length L2. Thus, the divider assembly 200 may be placed within the container 202 and the pin 206 may extend into the slot 204 anywhere along the first length L1 for the pin 206 to slidably contact the bus bar 216. Additionally, or alternatively, the bus bar 216 may include a plurality of sections along the second length L2, whereby the pin 206 may contact the bus bar 216 at one or more of the plurality of sections and be able to slide along the one or more sections. Additionally, or alternatively, the user may be encouraged to move the pin 206 to the retracted position to slide the divider assembly 200 along the first length L1 to avoid grinding the pin 206 against the bus bar 216.

Advantageously, the refrigerator appliance described herein allows a user to divide the container into portions that best suit the needs of the user. Specifically, the user can move the divider assembly horizontally anywhere along the first length to divide the container into portions. For example, the user may store small items in one portion on one side of the divider assembly, and the user may store larger items in a different portion on an opposite side of the divider assembly. Because the bus bar is continuous, the user can move the divider assembly without worrying about properly connecting the pin with a power source at a discrete location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A refrigerator appliance comprising:
- a cabinet;
- a container disposed within the cabinet, wherein the container defines a slot having a first length; and
- a divider assembly comprising:
  - a body;
  - a bus bar disposed between the cabinet and the container;
  - a pin coupled with the body, the pin configured to be received by the slot of the container and slidably contact the bus bar;
  - a retraction assembly comprising an actuator including a protrusion configured to be handled by a user, wherein the protrusion is coupled with the pin to allow the pin to move between an extended position and a retracted position relative to the body; and
  - a lighting assembly coupled with the body, wherein the lighting assembly is powered by the pin electrically coupled with the bus bar.

2. The refrigerator appliance of claim 1, wherein the container defines the slot horizontally such that the body of the divider assembly is able to be moved horizontally along the first length of the slot to allow the pin to extend into the slot to contact the bus bar.

3. The refrigerator appliance of claim 1, wherein the lighting system includes a light emitting diode (LED) to illuminate the body of the divider assembly.

4. The refrigerator appliance of claim 1, wherein the body has a peripheral edge, wherein the peripheral edge has a matte texture, and wherein the lighting assembly illuminates the peripheral edge of the body.

5. The refrigerator appliance of claim 4, wherein the body is transparent, and wherein light energy travels through the body to illuminate the peripheral edge.

6. The refrigerator appliance of claim 1, wherein the pin in the retracted position allows the body to be moved relative to the container.

7. The refrigerator appliance of claim 1, wherein the pin in the extended position allows the body to remain static relative to the container.

8. The refrigerator appliance of claim 1, wherein the bus bar extends a second length that is greater than or substantially equal to the first length of the slot.

9. The refrigerator appliance of claim 1, wherein the divider assembly further comprises a cover coupled with the body, and wherein the lighting assembly is positioned between the body and the cover.

10. The refrigerator appliance of claim 1, wherein the container has a first depth, wherein the body of the divider assembly has a second depth, and wherein the first depth and the second depth are substantially equal.

11. The refrigerator appliance of claim 1, wherein the body defines a track configured to receive the actuator.

12. A divider assembly for a refrigerator, the refrigerator comprising a cabinet, a container disposed within the cabinet, wherein the container defines a slot having a first length, the divider assembly comprising:
- a body;
- a bus bar disposed between the cabinet and the container;
- a pin coupled with the body, the pin configured to be received by the slot of the container and slidably contact the bus bar;

a retraction assembly comprising an actuator including a protrusion configured to be handled by a user, wherein the protrusion is coupled with the pin to allow the pin to move between an extended position and a retracted position relative to the body; and a lighting assembly coupled with the body, wherein the lighting assembly is powered by the pin electrically coupled with the bus bar.

13. The divider assembly of claim 12, wherein the divider assembly is able to be moved horizontally along the first length of the slot to allow the pin to extend into the slot to contact the bus bar.

14. The divider assembly of claim 12, wherein the lighting system includes a light emitting diode (LED) to illuminate the body of the divider assembly.

15. The divider assembly of claim 12, wherein the body has a peripheral edge, wherein the peripheral edge has a matte texture, and wherein the lighting assembly illuminates the peripheral edge of the body.

16. The divider assembly of claim 15, wherein the body is transparent, and wherein light energy travels through the body to illuminate the peripheral edge.

17. The divider assembly of claim 12, wherein the pin in the retracted position allows the body to be moved relative to the container.

18. The divider assembly of claim 12, wherein the pin in the extended position allows the body to remain static relative to the container.

19. The divider assembly of claim 12, further comprising a cover coupled with the body, and wherein the lighting assembly is positioned between the body and the cover.

20. The divider assembly of claim 12, wherein the body defines track configured to receive the actuator.

* * * * *